United States Patent
Cai et al.

(10) Patent No.: US 8,671,759 B2
(45) Date of Patent: Mar. 18, 2014

(54) METHOD AND APPARATUS FOR MEASURING AMOUNT OF MATERIAL REMOVED FROM TARGET IN PULSED LASER ABLATION

(75) Inventors: Yue Cai, Hong Kong (HK); Po Chun Chu, Hong Kong (HK); Nai Ho Cheung, Hong Kong (HK)

(73) Assignee: Hong Kong Baptist University, Kowloon Tong, Kowloon (HK)

( * ) Notice: Subject to any disclaimer, the term of this patent is extended or adjusted under 35 U.S.C. 154(b) by 363 days.

(21) Appl. No.: 13/192,502

(22) Filed: Jul. 28, 2011

(65) Prior Publication Data

US 2013/0025373 A1 Jan. 31, 2013

(51) Int. Cl.
*B23K 26/02* (2006.01)

(52) U.S. Cl.
USPC ........................................ 73/587; 219/121.83

(58) Field of Classification Search
USPC .................. 73/587, 646, 647; 219/121.83
See application file for complete search history.

(56) References Cited

U.S. PATENT DOCUMENTS 5,629,484 A * 5/1997 Liska .............................. 73/587
6,008,896 A * 12/1999 Sabsabi et al. ................ 356/318
2008/0186480 A1 * 8/2008 Lang et al. .................... 356/213

OTHER PUBLICATIONS

Hong et al., "Diagnostics and Real-time Monitoring of Pulsed Laser Ablation," Proceeding of SPIE, vol. 4426 (2002), pp. 51-54.*

* cited by examiner

*Primary Examiner* — John Chapman, Jr.
(74) *Attorney, Agent, or Firm* — Ella Cheong Hong Kong; Sam T. Yip

(57) ABSTRACT

A method for measuring the amount of material removed from a target in pulsed laser ablation is provided. The method includes generating a laser beam with a laser generator for ablating the target; driving the laser generator with a delay generator; acquiring the acoustic signal generated when the target is being ablated by the laser beam and generating an electrical signal accordingly with a microphone; amplifying the electrical signal generated by the microphone with a pre-amplifier; displaying an acoustic waveform indicating the intensity of the acoustic signal generated when the target is being ablated by the laser beam with a digital oscilloscope connected to the delay generator and the pre-amplifier; and deducing the amount of material removed from the target in the pulsed laser ablation according to the acoustic waveform in real time. An apparatus for performing the method is also provided.

16 Claims, 4 Drawing Sheets

METHOD AND APPARATUS FOR MEASURING AMOUNT OF MATERIAL REMOVED FROM TARGET IN PULSED LASER ABLATION

FIELD OF THE PATENT APPLICATION

The present patent application generally relates to laser ablation technologies and more particularly to a method and an apparatus for measuring the amount of material removed from a target in pulsed laser ablation.

BACKGROUND

Today, the small amount of materials removed in pulsed laser ablation is typically determined by depositing them on a quartz microbalance and measuring the shift in the quartz oscillator frequency. The method has many shortcomings: the instrumentation is costly, the smallest mass it can measure is fractions of nano-gram, and it generally requires operation in vacuum. Therefore, an inexpensive method with mass sensitivity down to tens of pico-gram and compatible with ambient air is desired.

SUMMARY

The present patent application is directed to a method and an apparatus for measuring the amount of material removed from a target in pulsed laser ablation. In one aspect, the present patent application provides an apparatus for measuring the amount of material removed from a target in pulsed laser ablation. The apparatus includes a laser generator configured to generate a laser beam to ablate the target; a delay generator for driving the laser generator; a microphone configured to acquire the acoustic signal generated when the target is being ablated by the laser beam and to generate an electrical signal accordingly; a pre-amplifier configured for amplifying the electrical signal generated by the microphone; and a digital oscilloscope being connected to the delay generator and the pre-amplifier, and configured to display an acoustic waveform indicating the intensity of the acoustic signal generated when the target is being ablated by the laser beam, the acoustic waveform being utilizable for deducing the amount of material removed from the target in the pulsed laser ablation in real time.

The laser beam may be a pulsed laser beam and the pulse width of the laser beam may be in the order of tens of nanoseconds or picoseconds. The wavelength of the laser beam may be in the range between 150 nm and 1064 nm.

The apparatus may further include a mirror, a lens, and a filter, the mirror and the lens being disposed along the optical path of the laser beam and configured to direct the laser beam onto the target, the filter being connected between the microphone and the pre-amplifier and configured to spectrally filter the output of the microphone.

The microphone may be a condenser microphone, and placed at a predetermined distance away from the target and a predetermined angle from the surface normal of the target.

The digital oscilloscope may be triggered synchronously by the delay generator.

The apparatus may further include a processing unit. The processing unit may be configured to process the acoustic waveform displayed by the digital oscilloscope based on a pre-established empirical relationship between the intensity of the acoustic signal and the amount of material removed by the laser ablation, and thereby to deduce the amount of material removed from the target in the pulsed laser ablation in real time.

The processing unit may be configured to incorporate the spot size of the laser beam into the deduction of the amount of material removed from the target in the pulsed laser ablation. If the target is made of aluminum, the pre-established empirical relationship is a linear relationship. If the target is made of polyvinyl chloride, the pre-established empirical relationship is an exponential relationship.

In another aspect, the present patent application provides a method for measuring the amount of material removed from a target in pulsed laser ablation. The method includes generating a laser beam with a laser generator for ablating the target; driving the laser generator with a delay generator; acquiring the acoustic signal generated when the target is being ablated by the laser beam and generating an electrical signal accordingly with a microphone; amplifying the electrical signal generated by the microphone with a pre-amplifier; displaying an acoustic waveform indicating the intensity of the acoustic signal generated when the target is being ablated by the laser beam with a digital oscilloscope connected to the delay generator and the pre-amplifier; and deducing the amount of material removed from the target in the pulsed laser ablation from the acoustic waveform in real time.

The laser beam may be a pulsed laser beam and the pulse width of the laser beam may be in the order of tens of nanoseconds or picoseconds.

The method may further include directing the laser beam onto the target by a mirror and a lens, and spectrally filtering the output of the microphone before amplifying the signal with a filter.

The method may further include placing the microphone at a predetermined distance away from the target and a predetermined angle from the surface normal of the target.

The step of deducing the amount of material removed from the target in the pulsed laser ablation may include processing the acoustic waveform displayed by the digital oscilloscope based on a pre-established empirical relationship between the intensity of the acoustic signal and the amount of material removed by the laser ablation with a processing unit.

The step of deducing the amount of material removed from the target in the pulsed laser ablation may further include incorporating the spot size of the laser beam into the deduction. If the target is made of aluminum, the pre-established empirical relationship is a linear relationship. If the target is made of polyvinyl chloride, the pre-established empirical relationship is an exponential relationship.

In yet another aspect, the present patent application provides a method for measuring the amount of material removed from a target in pulsed laser ablation. The method includes generating a laser beam with a laser generator for ablating the target and directing the laser beam onto the target with a mirror and a lens; driving the laser generator with a delay generator; acquiring the acoustic signal generated when the target is being ablated by the laser beam and generating an electrical signal accordingly with a microphone; amplifying the electrical signal generated by the microphone with a pre-amplifier; displaying an acoustic waveform indicating the intensity of the acoustic signal generated when the target is being ablated by the laser beam with a digital oscilloscope connected to the delay generator and the pre-amplifier; and deducing the amount of material removed from the target in the pulsed laser ablation from the acoustic waveform based on pre-established empirical functional relationships between the amount of material removed from the target, the intensity of the acoustic signal, and the spot size of the laser beam.

The pre-established empirical functional relationships may depend on the material of the target, and the step of deducing the amount of material removed from the target in the pulsed laser ablation may be performed concurrently with the pulsed laser ablation.

BRIEF DESCRIPTIONS OF THE DRAWINGS

DETAILED DESCRIPTION

Reference will now be made in detail to a preferred embodiment of the method and the apparatus for measuring the amount of material removed from a target in pulsed laser ablation disclosed in the present patent application, examples of which are also provided in the following description. Exemplary embodiments of the apparatus and the method disclosed in the present patent application are described in detail, although it will be apparent to those skilled in the relevant art that some features that are not particularly important to an understanding of the apparatus and the method may not be shown for the sake of clarity.

Furthermore, it should be understood that the method and the apparatus for measuring the amount of material removed from a target in pulsed laser ablation disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
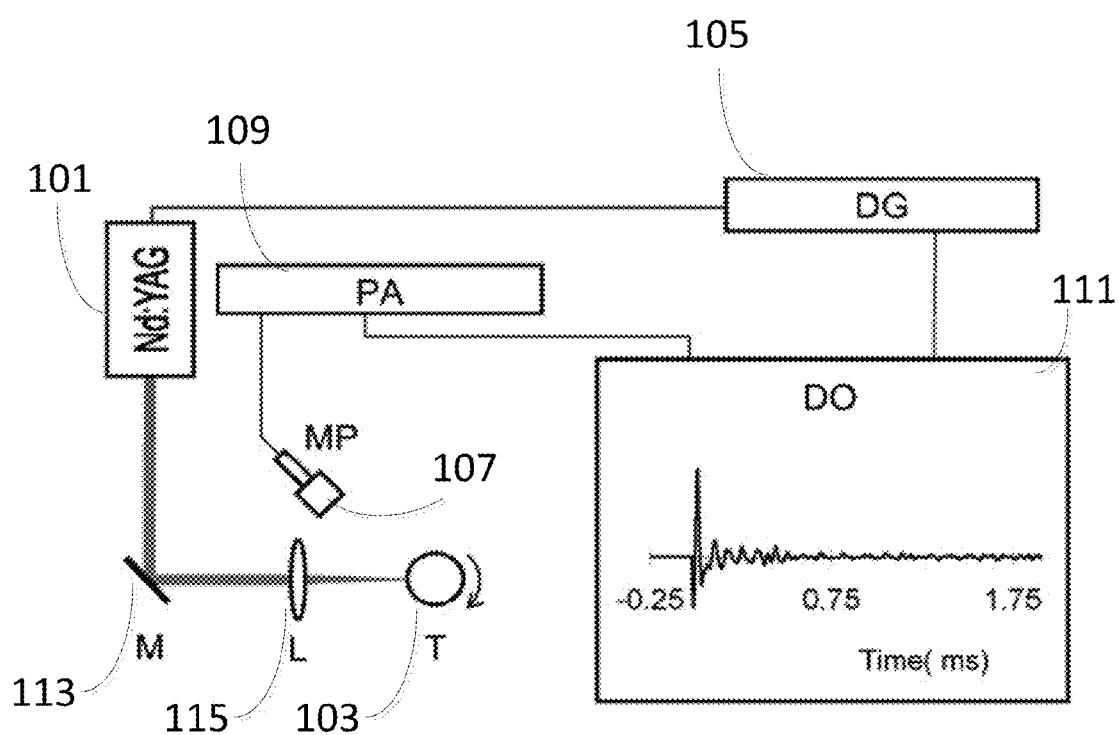
FIG. 1 is schematic diagram of an apparatus for measuring the amount of material removed from a target in pulsed laser ablation according to an embodiment of the present patent application.

FIG. 1 is schematic diagram of an apparatus for measuring the amount of material removed from a target in pulsed laser ablation according to an embodiment of the present patent application. Referring to FIG. 1, the apparatus includes a laser generator 101 configured to generate a pulsed laser beam for ablating a target 103, a delay generator 105 for driving the laser generator 101, a microphone 107 configured to acquire the acoustic signal generated when the target is being ablated by the laser beam and to generate an electrical signal accordingly, a low-noise pre-amplifier 109 configured for amplifying the electrical signal generated by the microphone 107, and a digital oscilloscope 111 being connected to the delay generator 105 and the pre-amplifier 109, and configured to display an acoustic waveform indicating the intensity of the acoustic signal generated when the target is being ablated by the laser beam. In this embodiment, preferably, the apparatus further includes a mirror 113 and a lens 115 disposed along the optical path of the laser beam and configured for directing the laser beam onto the target 103. In other words, the laser beam is steered by the mirror 113 and focused through the lens 115 onto the target 103. The target 103 is a rotating cylindrical target with a curved surface.

In the embodiment, the laser generator 101 is a Nd:YAG pulsed laser (Continuum Surelite II, 532 nm of wavelength, 10 Hz of frequency, 10 ns of pulse width). The lens 115 is a 100 mm focal length lens. The microphone 107 is a condenser microphone iLike Electronics, EM 732, placed 90 mm in front of the target 103 and 50° from the surface normal of the target 103. It is understood the microphone 107 may be placed at other predetermined distances away from the target 103 and other predetermined angles from the surface normal of the target 103. It is further understood that the microphone 107 may be other types of microphones, such as electret microphones and dynamic microphones. The key requirements for the microphone 107 are high sensitivity and broad frequency response. The microphone 107 is powered at 5.7 V and its output is amplified 10 times by the pre-amplier 109 (SRS 560 pre-amp, bandwidth set to 3 K-30 K) before feeding across a 50Ω load to the digital oscilloscope 111 (Tektronix TDS 1001B) that is triggered synchronously by the delay generator 105 (Quantum Composers 9520). The output of the microphone 107 is spectrally filtered by a filter built in the pre-amplifier 109, before being amplified by the pre-amplifier 109. It is understood that alternatively the filter may be not built in the pre-amplifier 109, but connected between the microphone 107 and the pre-amplifier 109.

Figure 2:
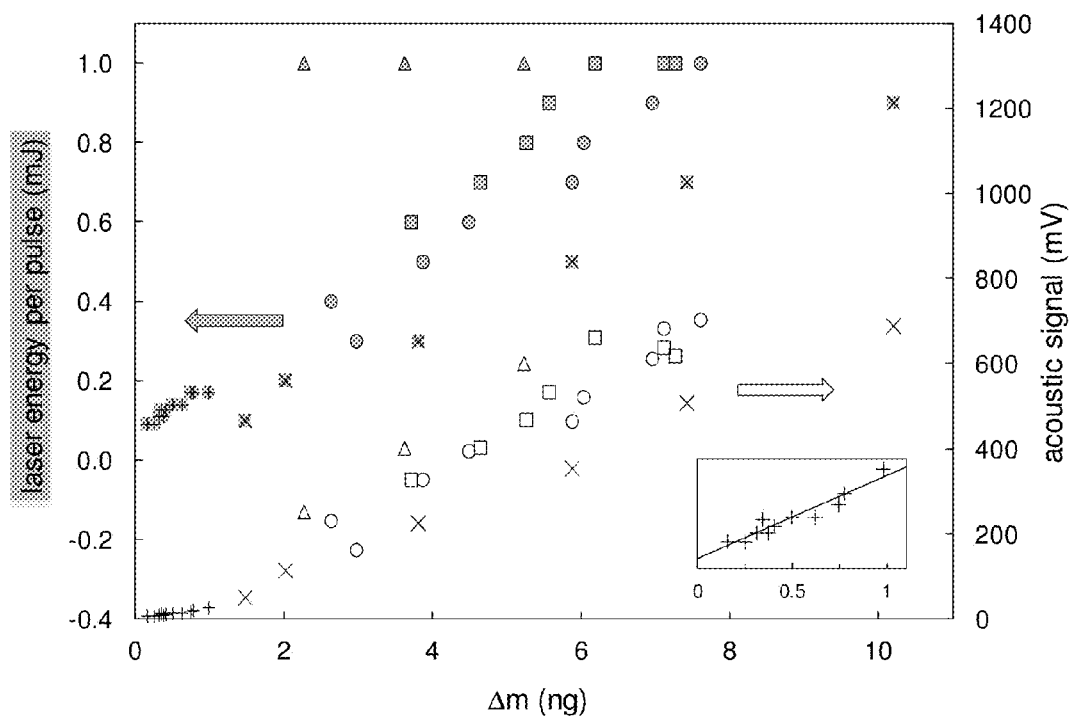
FIG. 2 shows pulsed laser ablation of aluminum Al 6061 alloy targets at various focal spot size ϕ and laser energy E.
Figure 4:
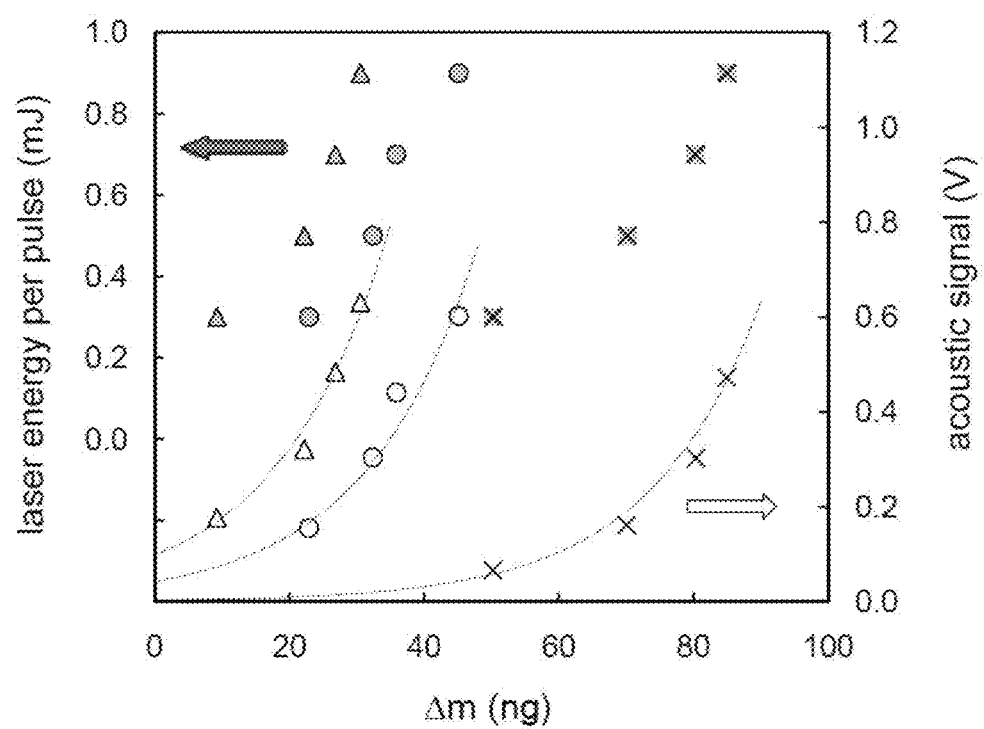
FIG. 4 shows pulsed laser ablation of PVC targets at various focal spot size ϕ and laser energy E.

The apparatus may further include a processing unit, for example, a computer. The acoustic waveform displayed by the digital oscilloscope 111, indicating the intensity of the acoustic signal generated when the target is being ablated by the laser beam, may be processed by the computer based on a pre-established empirical relationship between the intensity of the acoustic signal and the amount of material removed by the laser ablation, and the amount of material removed from a target in pulsed laser ablation may be deduced thereby. It is noted that the above deduction may be performed concurrently, i.e. in real time, with the pulsed laser ablation, after the empirical relationships (also referred to as the calibration curves) are established. The calibration curves are illustrated in FIG. 2 and FIG. 4, which will be described in more detail hereafter.

In this embodiment, as examples, two targets are made of aluminum 6061 alloy and polyvinyl chloride (PVC) respectively and machined to cylindrical targets 13 mm in diameter and 10 mm in height. Before ablation, these targets are cleaned ultrasonically in ethanol for 15 minutes, dried in nitrogen and then weighed eight times. The two extreme mass readings are discarded and the remaining values are averaged to give the target mass. The standard deviation gives the error.

The Nd:YAG laser pulses (Continuum Surelite II, 532 nm of wavelength, 10 Hz of frequency, 10 ns of pulse width) is then focused with the 100 mm focal length lens 115 onto the curved surface of the rotating target. The target is translated every 15 minutes to further prevent craters from overlapping. The pulse energy is adjusted by Q-switch timing, and the spot size is varied by defocusing. Microphone saturation is carefully avoided. The target is ablated continuously for 2 to 3 hours, with the averaged acoustic signal (peak-to-peak) being recorded every 15 minutes. The laser energy is monitored with a power meter (Ophir 10A-P-V2-SH) and is adjusted every 30 minutes to ensure constancy. Pulse energies ranging from 0.1 to 1.1 mJ, and fluences ranging from 1.5 to 88 J cm$^{-2}$ are used. After ablation, the targets are cleaned, dried and weighed the same way as before. The mass Δm removed per pulse is simply the mass difference divided by the number of shots.

For picosecond pulse ablation, another laser is used (Lumera Laser, Super Rapid, 532 nm, 1 KHz, 10 ps). The crater size is measured under an optical microscope (Nova, 20× objective). For aluminum targets and fixed lens position, the crater diameter ϕ is found to remain constant for fluences above 4 J cm$^{-2}$. That constant ϕ is taken to be the spot size.

It is understood that the laser generator 101 may be other types of laser sources depending on the material to be ablated by the laser. For example, if the apparatus illustrated in this embodiment is applied to LASIK (laser-assisted in situ keratomileusis) surgeries, the 193 nm nanosecond excimer lasers (sometimes femtosecond lasers) are generally used. In this embodiment, the wavelength of the laser beam generated by the laser source 101 is preferably in the range between 150 nm and 1064 nm.

FIG. 2 shows pulsed laser ablation of aluminum Al 6061 alloy targets at various focal spot size ϕ and laser energy E. Plotted is E against the mass Δm removed per pulse. + denotes picosecond ablation with ϕ=65-87 μm. The shaded points x, ○, □, and Δ denote nanosecond ablation with ϕ=25-42, 75-81, 91-125, and 150-225 μm, respectively. The corresponding plot of the acoustic signal A against Δm for the same ablation events is shown by the points not shaded. The x and y error bars are about twice and half the size of the data symbols, respectively. The inset shows the magnified plot of A vs Δm for the picosecond ablation events; the vertical scale ranged from 0 to 30 mV.

Figure 3:
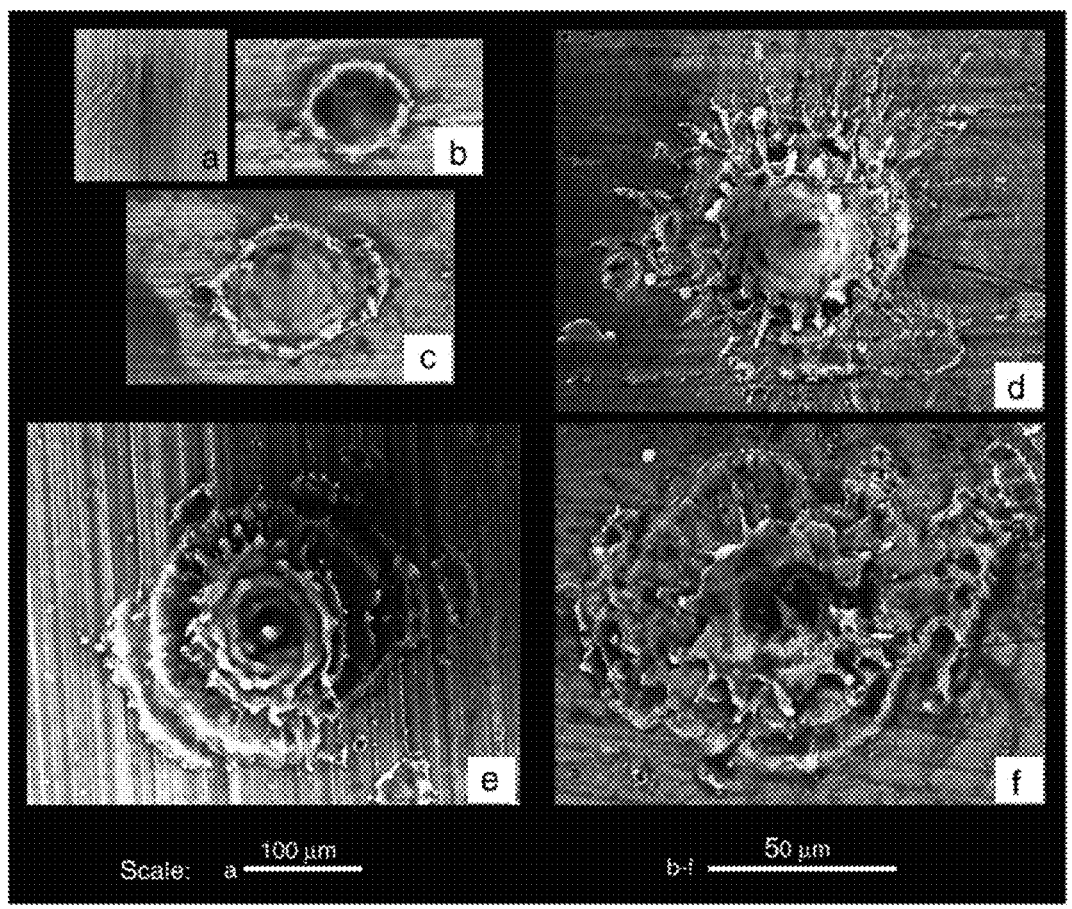
FIG. 3 are SEM (scanning electron micrograph) images of ablated craters created under different conditions for pulsed laser ablation of aluminum Al 6061 samples.

FIG. 3 are SEM (scanning electron micrograph) images of ablated craters created under different conditions for pulsed laser ablation of aluminum Al 6061 samples. Referring to FIG. 3, (a) shows 5 shots picosecond ablation at 3.6 J cm$^{-2}$, while (b) through (f) show single-shot nanosecond ablation at 1.6, 12, 24, 48, and 72 J cm$^{-2}$ respectively.

FIG. 4 shows pulsed laser ablation of PVC targets at various focal spot size ϕ and laser energy E. Plotted is E against the mass Δm removed per pulse. The shaded points Δ, ○, and x denote nanosecond ablation with ϕ=40, 75, and 100 μm, respectively. The corresponding plot of the acoustic signal A against Δm for the same ablation events is shown by the points not shaded. Both x and y error bars are about half the data symbol size. Exponential fits to the A-Δm data trends are also shown.

For aluminum, laser energy E against Δm is plotted in FIG. 2 (shaded data points). Both picosecond and nanosecond laser pulses focused to different spot size ϕ are used. Quite obviously, without knowing ϕ, Δm could not be accurately predicted from E. The prediction is improved if it is based on the acoustic signal A (FIG. 2, data points being not shaded); the error is 18% on average if linear A-Δm correlation is assumed. This is comparable to the 15% measurement error in Δm.

Referring to FIG. 2, in order to understand the A-Δm trend, we will first consider the picosecond ablation regime (+, Δm<1 ng). Below the ablation threshold, a small A of about 2.7 mV is detected. This weak thermal piston signal implied very mild heating. Above the threshold, a material plume is formed to drive an ablative piston. This signal is proportional to the pressure jump. Pressure increases with both vapor density and temperature. Given the non-thermal picosecond ablation, only vapor density matters and A therefore varies linearly with Δm.

Referring to FIG. 2, with nanosecond ablation (Δm>1 ng), thermal effect is significant and A therefore increases nonlinearly with Δm at the ps-ns transition. One might expect A to keep bending up. However, melt ejection soon occurred, as evidenced by the scanning electron micrographs shown in FIG. 3. Splashing dampened the acoustic signal to produce the fortuitous linear A-Δm trend.

Melt ejection would escalate at higher laser fluence, resulting in a lower A for the same Δm if ϕ is smaller. Indeed, that is the trend observed in FIG. 2. The linear fit to the large ϕ data (Δ in FIG. 2) is steeper than that of the small ϕ data (x in FIG. 2).

One can fit the various ϕ trends by a simple linear equation:

$$A=\alpha(\Delta m-0.6), \quad (1)$$

with A in mV and Δm in ng; and α increased with ϕ (in μm) as:

$$\alpha(\phi)=0.38\phi+63 \quad (2)$$

Using Eqs. (1) and (2), one could predict Δm based on A and ϕ. The error is 8% on average, smaller than the 18% when ϕ effect is not considered.

The sensitivity of the acoustic technique can be estimated as follows. With the laser firing but with the beam blocked from ablating the target, the standard deviation of the noise waveform is 0.27 mV. Based on the A-Δm plot shown in FIG. 2, the noise equivalent Δm is about 12 pg.

Analogous results for PVC are shown in FIG. 4, when nanosecond pulses focused to three different ϕ are used. As can be seen, ϕ entered in all correlations, be it E-Δm or A-Δm. A is noticeably less than the aluminum case. For instance, at 40 μm ϕ (Δ, FIG. 4), 10 ng Δm gives 200 mV A; aluminum targets would produce a five times louder pop for the same Δm (see FIG. 2).

The lower A is unexpected because PVC, being lighter than aluminum, should release more molecules to generate a louder bang for the same Δm. The low A is probably because of two reasons. First, even with laser energy below the ablation threshold, chlorine would be released from heated PVC, though too slowly to produce ablative piston signals yet enough to register measurable Δm. Second, the plume consists of large polymeric fragments instead of atoms. The particle number density could be low.

The second reason may also explain the exponential increase in A with Δm at a fixed ϕ. Higher ablation rates implies higher laser fluences and therefore higher plume temperature to favor thermal decomposition of the plume debris. The exponential A-Δm trends at each ϕ can be fitted by:

$$A=\beta \exp(0.06\Delta m), \quad (3)$$

with A in mV and Δm in ng. The exponential factor is independent of ϕ. The pre-exponential factor β depends on ϕ (in μm) as:

$$\beta(\phi)=160-1.6\phi \quad (4)$$

Given A and ϕ, one can use Eqs. (3) and (4) to predict Δm. The resultant error is 4% on average, which is comparable to the Δm measurement error of 3.3%.

In the above embodiments, acoustic monitoring is shown to be a sensitive and reliable method for measuring in real-time the mass Δm removed in pulsed laser ablation. Given the acoustic signal A and the spot size ϕ, Δm can be accurately deduced provided that the functional form of Δm(A, ϕ), i.e. the calibration curves, or the empirical (functional) relationships between Δm, A and ϕ, is pre-established. It is understood that functional forms of Δm(A, ϕ) depend on the material of the target to be laser ablated. The functional forms for aluminum and PVC are provided above only as examples. It is further understood that the approach and technique provided in the above embodiments may be extended to other materials and applied to real-world problems such as laser refractive surgeries, microprobe analysis, precision trimming and etc.

While the present patent application has been shown and described with particular references to a number of embodiments thereof, it should be noted that various other changes or modifications may be made without departing from the scope of the present invention.

What is claimed is:

1. An apparatus for measuring the amount of material removed from a target in pulsed laser ablation, the apparatus comprising:
    a laser generator configured to generate a laser beam to ablate the target;
    a delay generator for driving the laser generator;
    a microphone configured to acquire the acoustic signal generated when the target is being ablated by the laser beam and to generate an electrical signal accordingly;
    a pre-amplifier configured for amplifying the electrical signal generated by the microphone;
    a digital oscilloscope being connected to the delay generator and the pre-amplifier, and configured to display an acoustic waveform indicating the intensity of the acoustic signal generated when the target is being ablated by the laser beam;
    a defocusing component for varying spot size of the laser beam; and
    a processing unit configured to process the acoustic waveform displayed by the digital oscilloscope based on a pre-established empirical relationship between the intensity of the acoustic signal, variation of the spot size of the laser beam and the amount of material removed by the laser ablation in order to deduce the amount of material removed from the target in the pulsed laser ablation in real time.

2. The apparatus of claim 1, wherein the laser beam is a pulsed laser beam and the pulse width of the laser beam is in the order of tens of nanoseconds or picoseconds.

3. The apparatus of claim 2, wherein the wavelength of the laser beam is in the range between 150 nm and 1064 nm.

4. The apparatus of claim 1 further comprising a mirror, a lens, and a filter, the mirror and the lens being disposed along the optical path of the laser beam and configured to direct the laser beam onto the target, the filter being connected between the microphone and the pre-amplifier and configured to spectrally filter the output of the microphone.

5. The apparatus of claim 1, wherein the microphone is a condenser microphone, and placed at a predetermined distance away from the target and a predetermined angle from the surface normal of the target.

6. The apparatus of claim 1, wherein the digital oscilloscope is triggered synchronously by the delay generator.

7. The apparatus of claim 1, wherein if the target is made of aluminum, the pre-established empirical relationship is a linear relationship.

8. The apparatus of claim 1, wherein if the target is made of polyvinyl chloride, the pre-established empirical relationship is an exponential relationship.

9. A method for measuring the amount of material removed from a target in pulsed laser ablation, the method comprising:
    generating a laser beam with a laser generator for ablating the target;
    driving the laser generator with a delay generator;
    acquiring the acoustic signal generated when the target is being ablated by the laser beam and generating an electrical signal accordingly with a microphone;
    amplifying the electrical signal generated by the microphone with a pre-amplifier;
    displaying an acoustic waveform indicating the intensity of the acoustic signal generated when the target is being ablated by the laser beam with a digital oscilloscope connected to the delay generator and the pre-amplifier;
    varying spot size of the laser beam;
    processing the acoustic waveform display the digital oscilloscope based on a pre-established empirical relationship between the intensity of the acoustic signal, variation of the spot size of the laser beam and the amount of material removed by the laser ablation with a processing unit; and
    deducing the amount of material removed from the target in the pulsed laser ablation from said processing the acoustic waveform in real time.

10. The method of claim 9, wherein the laser beam is a pulsed laser beam and the pulse width of the laser beam is in the order of tens of nanoseconds or picoseconds.

11. The method of claim 9 further comprising directing the laser beam onto the target by a mirror and a lens, and spectrally filtering the output of the microphone before amplifying the signal with a filter.

12. The method of claim 9 further comprising placing the microphone at a predetermined distance away from the target and a predetermined angle from the surface normal of the target.

13. The method of claim 9, wherein if the target is made of aluminum, the pre-established empirical relationship is a linear relationship.

14. The method of claim 9, wherein if the target is made of polyvinyl chloride, the pre-established empirical relationship is an exponential relationship.

15. A method for measuring the amount of material removed from a target in pulsed laser ablation, the method comprising:
    generating a laser beam with a laser generator for ablating the target and directing the laser beam onto the target with a mirror and a lens;
    driving the laser generator with a delay generator;
    acquiring the acoustic signal generated when the target is being ablated by the laser beam and generating an electrical signal accordingly with a microphone;
    amplifying the electrical signal generated by the microphone with a pre-amplifier;
    displaying an acoustic waveform indicating the intensity of the acoustic signal generated when the target is being ablated by the laser beam with a digital oscilloscope connected to the delay generator and the pre-amplifier;
    varying spot size of the laser beam;
    and deducing the amount of material removed from the target in the pulsed laser ablation from processing the acoustic waveform in real time based on pre-established empirical functional relationships between the amount of material removed from the target, the intensity of the acoustic signal, and variation of the spot size of the laser beam.

16. The method of claim 15, wherein the pre-established empirical functional relationships depend on the material of the target, and the step of deducing the amount of material removed from the target in the pulsed laser ablation is performed concurrently with the pulsed laser ablation.

* * * * *